June 27, 1933.   H. C. MITCHELL ET AL   1,915,941
CONTROL SYSTEM AND APPARATUS
Filed Feb. 15, 1933   3 Sheets-Sheet 1
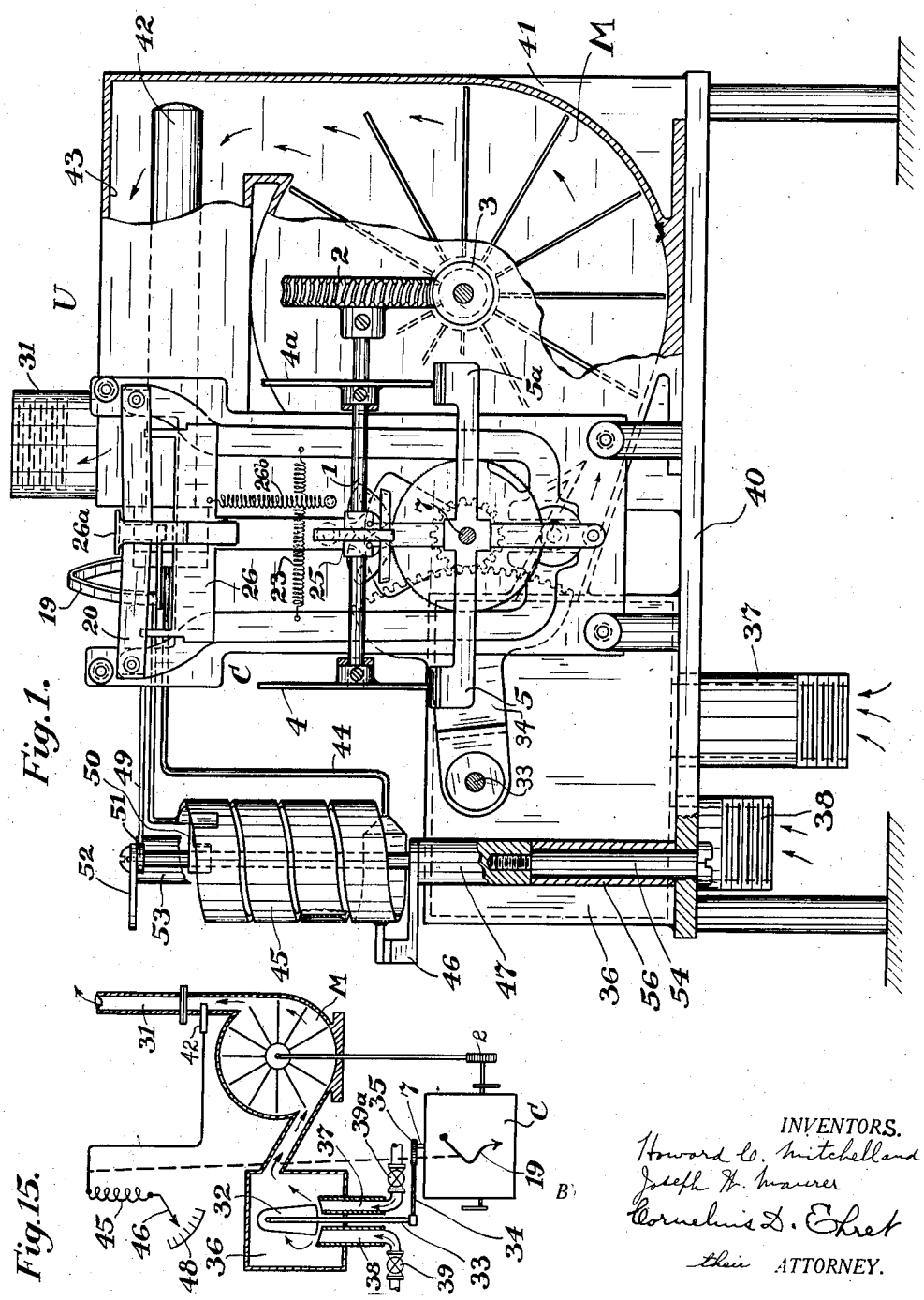
INVENTORS.
Howard C. Mitchell and
Joseph W. Maurer
Cornelius D. Ehret
their ATTORNEY.

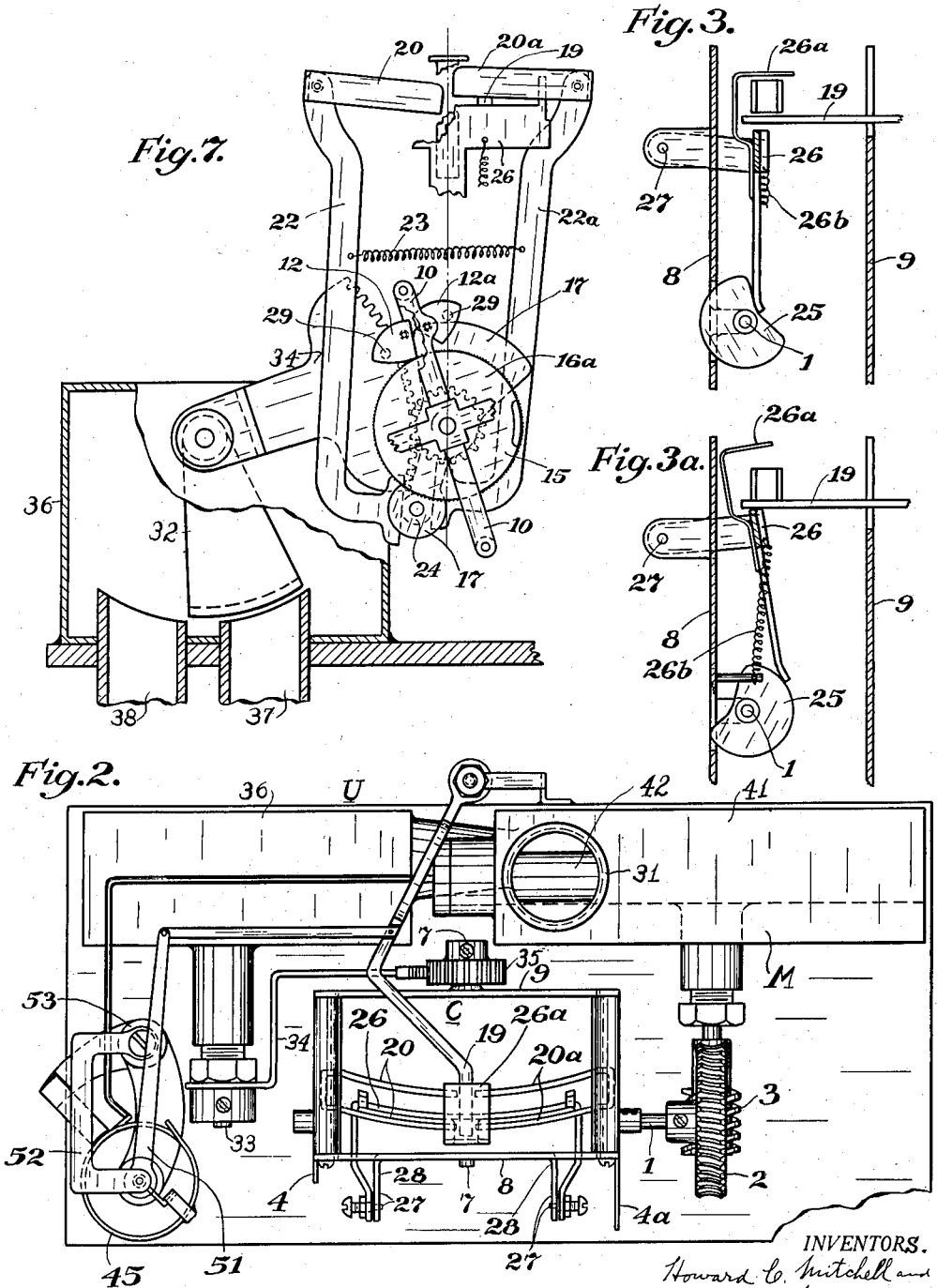

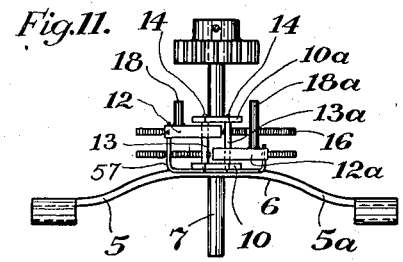
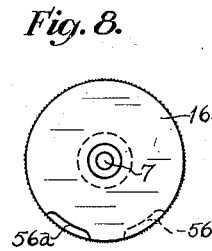
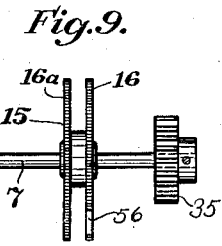
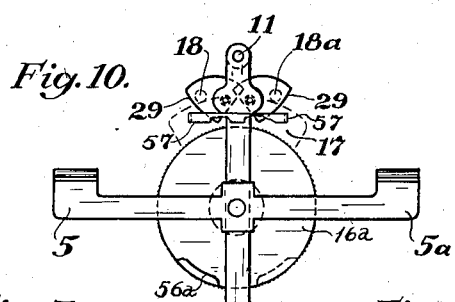
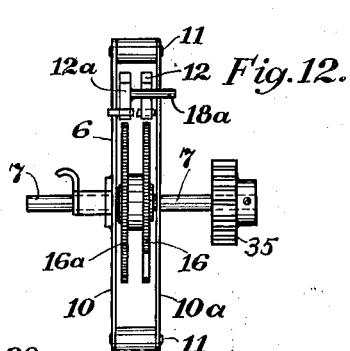
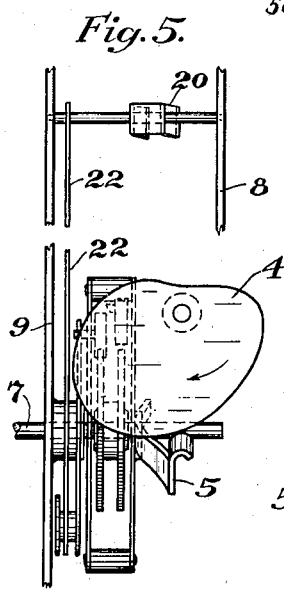
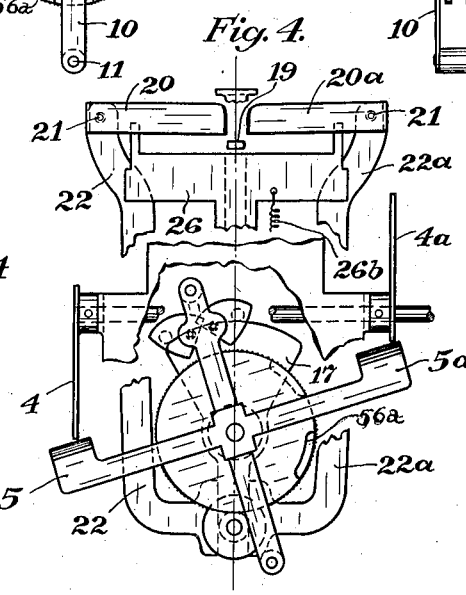
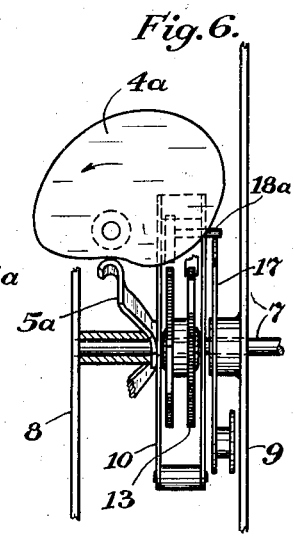
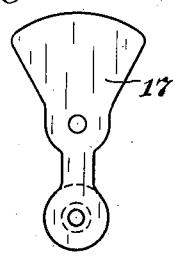
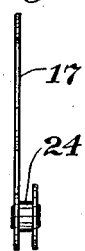

Patented June 27, 1933

1,915,941

UNITED STATES PATENT OFFICE

HOWARD C. MITCHELL, OF PHILADELPHIA, AND JOSEPH W. MAURER, OF ELKINS PARK, PENNSYLVANIA

CONTROL SYSTEM AND APPARATUS

Application filed February 15, 1933. Serial No. 656,820.

Our invention relates to methods and systems for measuring the magnitude or changes in magnitude of a condition, and effecting a control in accordance therewith.

In the control of the magnitude of a condition by a controller mechanism having a cycle including measurement of the condition, and the establishment of a driving connection between motive means and a control device in accordance with the measurement, our invention, in one of its aspects, contemplates decreasing the time per cycle of operation of the controller mechanism inversely with rate of flow, for example, of an agent, a condition of which, as temperature, is measured and controlled.

More particularly, the motive means for driving the controller mechanism is in the path of flow of fluid being controlled in order that the controller mechanism shall be in operation only during flow of the fluid, and, as above stated, during flow of fluid, the frequency of the cycle of operation of the controller mechanism increases for increase of rate of flow of the fluid because of increased speed of the motor with increase of rate of flow.

In another aspect, our invention is concerned with controller mechanism in which driving clutch members carried by an oscillating framework are held out of driving engagement with a driven clutch member by cam structure which is moved from its neutral position, upon deflection of an element responsive to temperature or other condition, selectively to release one or the other of the driving clutch members to effect movement of the driven clutch member in a direction primarily determined by the sense of movement of the deflecting element, and preferably to an extent related to the extent of the deflection.

For an understanding of our invention, and for illustration of a preferred form thereof, reference is to be had to the accompanying drawings in which:

Fig. 1 is a front elevational view, with parts broken away and parts in section, of a control unit embodying the invention.

Fig. 2 is a top plan view of the apparatus shown in Fig. 1, with parts omitted for clarity.

Figs. 3 and 3a are side elevational views showing parts appearing in Fig. 1, in different operating positions.

Fig. 4 is a detail view of parts shown in Fig. 1.

Figs. 5 and 6 are left and right hand elevational views respectively of parts shown in Fig. 4.

Fig. 7 is a detail view including elements shown in Fig. 4 in different operative relation.

Figs. 8 and 9 are front and side elevational views respectively of the control, or driven clutch member.

Fig. 10 is a detail view showing the driven clutch members of Figs. 8 and 9 in association with the driving clutch structure.

Figs. 11 and 12 are top plan and side elevational views respectively of Fig. 10.

Fig. 13 is a detail view of cam structure shown in preceding figures.

Fig. 14 is a side elevational view of Fig. 13.

Fig. 15 diagrammatically illustrates a system utilizing the control unit of Fig. 1.

The controller mechanism C of the control unit U, Fig. 1, comprises the shaft 1 which is driven through gearing 2, 3 from a suitable motor M, such as an electric motor, or as more specifically illustrated, a fluid motor. The cams 4, 4a mounted on shaft 1 engage the arms 5, 5a of the framework 6 which is freely rotatable on shaft 7 extending at right angles to shaft 1, and which, as indicated in Fig. 2, is journalled in the front and rear frames 8, 9 respectively. For clarity the front plate 8 has been omitted from Fig. 1. The framework 6 which is continuously oscillated by cams 4, 4a so long as the controller is in operation, comprises the members 10, 10a held in spaced relation by the rivets 11 or equivalent. The driving clutch members 12, 12a are secured to sleeves 13, 13a freely rotatable on the pins 14 extending between the frames 10, 10a. The driven clutch member 15 adapted to be driven by motor M through driving member 12 or 12a, as hereinafter described, comprises the disks 16, 16a secured in fixed relation with respect to each other and to shaft 7.

The cam 17 also loosely journalled on shaft 7 normally holds both driving clutch members 12, 12a out of engagement with the disks 16, 16a of the controlled member 15. The pins 18, 18a shown most clearly in Fig. 11, extend rearwardly from the clutch members 12, 12a normally to rest upon the edge of cam member 17, which is of such extent that with cam 17 in its neutral position shown in Fig. 14 both pins 18 and 18a remain in engagement with cam 17 throughout the angle of movement of the framework 6, and are held thereby from engagement with the driven clutch disks 16, 16a of the controlled member 15.

To effect control or movement of the shaft 7 by motor M, in accordance with the change of the particular condition under measurement, as temperature, pressure, etc., the deflection of the element 19, which departs from its neutral or central position shown in Fig. 4, upon change in the condition under measurement, is communicated to or utilized to change the position of cam 17 by mechanism now described. The arms 20, 20a pivoted at 21, 21 extend from opposite sides of the frame of the controller toward each other and terminate short of the neutral position of the needle or deflecting element 19, as shown in Fig. 4. The depending arms 22, 22a, connected respectively to arms 20, 20a are biased toward each other by spring 23, Fig. 7, and at their lower ends they engage the opposite sides of pin 24 or equivalent carried by the cam member 17 below its axis of rotation 7.

Referring to Figs. 3 and 3a, the cam 25 secured to shaft 1 intermittently raises arm 26, which is pivoted at 27, 27 to the supports 28, to engage and lift the deflecting element 19. The spring 26b biases the arm 26 to its lower position. So long as the element 19 is in its central or neutral position, Fig. 4, the rising and falling of the arm 26 is without effect upon the position of the controlled shaft 7. Assuming, however, that the needle 19 has deflected to the right as shown in Fig. 7; when the arm 26 is next raised by cam 25, the needle forms a connection between arm 26 and the pivoted arm 20a, to effect clockwise movement of the cam 17 from its central or neutral position. When the oscillating frame 6 in the cycle of operation of the machine moves in counter-clockwise direction, the pin 18 of the driving clutch member 12 drops from the left end of the cam 17. As shown, the member 12 is pivoted eccentrically and the radial distances between the pivot of the cam 17 and the face 29 thereof are increasingly greater than the distance between the pivot of the cam 17 and the adjacent edge of disk 16 so that as the frame 6 continues in its counter-clockwise movement the member swings counter clockwise about its pivot 14 to function as a wedge locking the driving clutch member 15 to the framework 6. The surface of the disks 16, 16a may, as indicated, be serrated, or otherwise roughened, to enhance the driving engagement between the clutch members 12 and 16. Member 15 is therefore moved in counter-clockwise direction. As soon as the oscillating member 6 reverses its direction of movement, the driving member swings in reverse direction about its pivot for discontinuance of the wedging engagement, and until pin 18 is lifted on cam 17, member 12 ratchets or slides idly over the surface of disk 16. For the rest of the cycle, both members 12, 12a are held from the driven clutch member by cam 17.

Subsequently in the cycle, bar 26 is lowered, by spring 26b, whereupon the resetting element 26a restores cam 17 to neutral position by depressing arm 20a to its normal or horizontal position. For that part of the cycle during which the oscillating framework is capable of driving clutch member 15, the needle 19 holds the cam 17 in its deflected position, assuming the needle to be in deflected position.

If the needle 19 deflects to the left of neutral, the cam 17 is rotated in counter-clockwise direction about its pivot 7 by arm 22, and pawl 12a is permitted to drop into driving engagement with the driven clutch member 15 to effect clockwise rotation of the driven clutch member as will be readily understood from the drawings and aforesaid description. Accordingly it appears that the controlled shaft 7 is rotated in opposite directions for opposite senses of deflection of the element 19.

The extent of movement of the controlled shaft 7 varies with the extent of displacement of the needle from neutral; referring to Fig. 7, for example, the greater the deflection of needle 19 to the right, the more nearly it approaches the pivot 21 of arm 20a and therefore the greater the angular rotation of arm 22a for the fixed stroke of the lifting arm 26.

The stops 30 extending upwardly from the aforesaid ends of the pointer lifting bar 26, define the limits of deflection of the pointer 19, and therefore the maximum displacement of the cam 17 in both directions from neutral.

To prevent straining or damaging the mechanism, connection between the driving and driven clutch member is precluded when the shaft 7 or other controlled member, has reached a predetermined limiting position and prevents rotation of shaft 7 until the pointer 19 sets cam 17 to effect reverse movement of the shaft; for example, when shaft 7 is rotated to such extent in counter-clockwise direction that the depression 56a of disk 16a is disposed beneath pawl 12a, the pawl upon dropping off cam 17 does not engage disk 16a as the stop bar 57 prevents the pawl from dropping far enough to engage the disk edge of reduced diameter within the cut-out 56a. Although needle 19 may be in position demanding further clockwise movement of shaft 7, the movement is not permitted to occur. However, as soon as cam 17 is rotated in counter-clockwise direction, pawl 12 is effective to move shaft 7 in clockwise direction, as above described.

Similarly if and when shaft 7 is moved to its other limiting position by pawl 12, the cut-out 56 of disk 16 precludes further movement in clockwise direction, without however, preventing pawl 12a from effecting reverse movement of shaft 7 upon deflection of needle 7 to the other side of neutral.

The controller mechanism as shown and described is adapted to be used in the measurement or control of a condition as temperature, pressure, etc.; the pointer 19 being connected to or comprising part of an instrument suitable for response to the particular condition under measurement. The movements of the controlled shaft 7 may be utilized to record the changes in condition or to control the magnitude of the condition.

For illustration of one of the uses of the instrument there is now described a system for controlling the temperature of water or other liquid.

Referring to Fig. 15, the needle or pointer 19 is responsive to the temperature of liquid flowing through pipe 31 to any point of domestic, industrial, or other use. Upon deflection of the pointer 19 from its neutral position, which is set as hereinafter described to correspond to a desired temperature, the controller C responds, as explained above, to effect movement of shaft 7 in one direction or the other. The valve member 32 is operatively connected through shaft 33, gear sector 34, and gear 35 to shaft 7, so that rotation of shaft 7 effects corresponding movement of valve 32 which in the particular arrangement shown, differentially varies the amount of fluid entering the mixing chamber 36 from the hot water conduit 37 and cold water conduit 38. Accordingly, if the temperature of water flowing to the pipe 31 falls below the desired value, the valve 32 is operated by motor M through the controller mechanism to increase the ratio of hot to cold water, and vice versa.

When valves 39 and 39a are closed to stop the flow of water to outlet pipe 31, the controller ceases to operate since the motor M in the particular system specifically illustrated is a fluid motor disposed in the path of fluid flowing through pipe 31. The inclusion of the controller motor in the path of flow of the liquid under control also reduces the time per cycle of operation of the control mechanism with increase in rate of flow of the control liquid; i. e., the greater the amount of liquid flowing through pipe 31 the higher the speed of the control mechanism C and the shorter the time of its cycle of operation.

Referring to Figs. 1 and 2, for more specific description of the control unit, the frame 40 supports the mixing chamber 36, the motor housing 41 and the controller mechanism C. The tube 42 extending into the conduit 43 between the discharge side of the motor and the outlet 31 of the unit, contains suitable fluid whose volume changes with change in temperature of the water or other liquid flowing through passage 43. The tube communicates through the flexible tubing 44 with the lower end of the hollow spiral member 45 which is secured to the arm 46 fastened to and rotatable with member 47. To set the apparatus to maintain the water at predetermined temperature the arm 46 is rotated to the proper point along the temperature scale 48, Fig. 15, and is suitably clamped or held in that position.

The upper, free end of the spiral is connected by member 49, 49a to the pointer or deflecting element 19 of the controller mechanism. Any other suitable device for effecting movement of pointer 19 with change of temperature of the water may be used. So long as the needle is in the neutral position, the position of valve 32 remains unchanged. If the temperature increases or decreases the pointer 19 moves to the right or left of neutral in accordance with the expansion or contraction of the spiral 45, whereupon as above described, the position of valve 32 changes in the proper direction to restore the temperature to the predetermined value selected by setting of the member 46.

The spiral 45 is maintained in its vertical position by arm 50 which holds the free end of the spiral in proper spaced position with respect to the rod 51 which is pivotally supported at its upper end in the arm 52 extending from the standard 53 and at its lower end rotatably mounted in the pivoted member 47. The member 47, arm 46, standard 53, and spiral 55, are mounted to rotate as a unit with the shaft or pin 54 extending through the bearing or guide 56 whose upper end supports the unit.

Whereas for purposes of explanation, we have illustrated and described a preferred embodiment of our invention, it is to be understood that the invention is not limited thereto but is co-extensive in scope with the appended claims.

What we claim is:

1. Apparatus comprising a deflecting member, cam structure, a source of power, means controlled by said deflecting member to effect movement of said cam structure by said source of power to a position determined by deflection of said member, a driven clutch member, oscillating structure, and a driving clutch member carried thereby and normally held from engagement with said driven clutch member by said cam structure and released thereby for driving engagement with said driven clutch member upon deflection of said deflecting member.

2. Apparatus comprising a deflecting member, cam structure, a source of power, means controlled by said deflecting member to effect movement of said cam structure by said source of power from a neutral position upon deflection of said member to a position determined by the sense of said deflection, a driven clutch member, oscillating structure, and clutch members carried by said oscillating structure held from engagement with said driven clutch member by said cam structure when in neutral position and selectively released thereby for driving engagement with said driven clutch member in accordance with the sense of displacement of said cam structure from neutral position.

3. Apparatus comprising a deflecting element, cam structure moved from neutral position upon deflection of said element, intermittently operating means for restoring said cam structure to neutral position, a driven clutch member, oscillating structure, and a driving clutch member carried thereby normally held from driving connection with said driven clutch member by said cam structure, and released thereby for driving engagement with said driven clutch member upon deflection of said deflecting member.

4. Apparatus comprising a pivotally mounted driven clutch member, oscillating structure pivoted concentric to said driven clutch member and carrying driving clutch members, cam structure pivoted concentric to said oscillating structure and adapted, when in neutral position, to prevent driving engagement between said driven and driving clutch members, and a responsive device for displacing said cam structure from neutral position to permit movement of said driven clutch member by a selected driving clutch member.

5. Apparatus comprising a driven clutch member, oscillating structure carrying a driving clutch member, cam structure, adapted when in neutral position, to prevent engagement between said clutch members, an element deflecting in response to change of a condition, and intermittently operating means for engaging said element when deflected to move said cam structure from neutral position to permit driving engagement between said clutch members.

6. Apparatus comprising a driven clutch member, oscillating structure carrying a driving clutch member, cam structure, adapted when in neutral position, to prevent engagement between said clutch members, an element deflecting in response to change of a condition, and intermittently operating means for engaging said element when deflected to move said cam structure from neutral position and to retain it in displaced position during oscillation of said structure.

7. Apparatus comprising a driven clutch member, oscillating structure carrying driving clutch members, cam structure adapted, when in neutral position, to prevent driving engagement between said driven and driving clutch members, an element deflecting from neutral in response to change of a condition, members disposed on opposite sides of neutral of said element, and operatively connected to said cam structure, and intermittently operable means for effecting movement of one or the other of said last-named members upon deflection of said element to effect selective release of one of said driving clutch members.

8. Apparatus comprising a deflecting member, cam structure moved to a position determined by deflection of said member, driven clutch member, oscillating structure, a driving clutch member carried thereby and normally held from engagement with said driven clutch member by said cam structure and released thereby for driving engagement with said driven clutch member upon deflection of said deflecting member, and means effective when said driven clutch member reaches a limiting position for one direction of movement to prevent driving engagement between said members tending to effect further movement in said direction.

9. Apparatus comprising a deflecting member, cam structure moved from a neutral position upon deflection of said member to a position determined by the sense of said deflection, a driven clutch member, oscillating structure, clutch members carried by said oscillating structure held from engagement with said driven clutch member by said cam structure when in neutral position and selectively released thereby for driving engagement with said driven clutch member in accordance with the sense of displacement of said cam structure from neutral position, and means effective when said driven clutch member reaches either of its limiting positions to prevent engagement of said driven clutch member with the driving clutch member otherwise effective to tend to move it beyond said limiting position while permitting reverse movement of said driven clutch member by the other driving clutch member if released by said cam structure.

10. A control system comprising means adjustable to vary a condition of a flowing agent, controller mechanism for periodically measuring said condition and adapted to adjust said means, and means for increasing the frequency of the cycle of operation of said controller mechanism upon increase in rate of flow of said agent.

11. A control system comprising means adjustable to control the temperature of a flowing fluid, controller mechanism for periodically measuring the temperature and adapted to adjust said means, and means for decreasing the time per cycle of operation of said controller mechanism upon increase in the rate of flow of said liquid.

12. A control system comprising means adjustable to regulate the addition of an agent to a flowing fluid, controller mechanism for periodically measuring the effect of addition of said agent and adapted to adjust said means, and means for decreasing the time per cycle of operation of said controller mechanism for increase of the rate of flow of said liquid.

13. A control system comprising means adjustable to vary the ratio of components of a flowing stream, controller mechanism for periodically measuring a condition of said stream and adapted to adjust said means, and means for varying the time per cycle of operation of said controller mechanism inversely to change in the rate of flow of said stream.

14. A control unit comprising valve structure, controller mechanism having a responsive deflecting member, a controlled member for operating said valve structure, a fluid motor, a clutch between said fluid motor and said controlled member, and means intermittently operated by said motor cooperating with said deflecting member to control said clutch, said motor and said valve structure being included in a path for fluid through said unit.

15. Apparatus comprising a deflecting member, cam structure, a source of power, means controlled by said deflecting member to effect movement of said cam structure by said source of power to a position determined by deflection of said member, said deflecting member retaining said cam structure in said position only by deflecting for part of the cycle of operation of said apparatus, a driven clutch member, structure oscillating during said part of said cycle, and a driving clutch member carried by said oscillating structure, held from engagement with said driven clutch member by said cam structure when in neutral position and released thereby for driving engagement with said driven clutch member when said cam structure is held in deflected position.

16. Apparatus comprising a member deflecting from neutral in response to changes in a condition, cam structure moved during the cycle of said apparatus from neutral position in accordance with the deflection of said member and thereafter during the cycle returned to neutral position, a driven clutch member, and a driving clutch member controlled by said cam structure adapted to engage and drive said driven clutch member while said cam structure is in deflected position.

HOWARD C. MITCHELL.
JOSEPH W. MAURER.

CERTIFICATE OF CORRECTION.

Patent No. 1,915,941.  June 27, 1933.

HOWARD C. MITCHELL, ET AL.

It is hereby certified that error appears in the printed specification of the above numbered patent requiring correction as follows: Page 5, line 73, claim 15, strike out the words "by deflecting"; and that the said Letters Patent should be read with this correction therein that the same may conform to the record of the case in the Patent Office.

Signed and sealed this 21st day of November, A. D. 1933.

F. M. Hopkins
Acting Commissioner of Patents.

(Seal)